May 23, 1950 S. Y. WHITE 2,509,049

INDUCTANCE COIL

Original Filed Dec. 8, 1942 4 Sheets-Sheet 1

Inventor
Sidney Y. White
By Moses, Nolte, Crews & Berry
Attorney

May 23, 1950 | S. Y. WHITE | 2,509,049

INDUCTANCE COIL

Original Filed Dec. 8, 1942 | 4 Sheets-Sheet 2

Inventor

Sidney Y. White

By Moses, Nolte, Crews & Berry

Attorney

INDUCTANCE COIL

Original Filed Dec. 8, 1942 4 Sheets-Sheet 3

Inventor
Sidney Y. White
By Moses, Nolte, Crews & Berry
Attorney

May 23, 1950 S. Y. WHITE 2,509,049

INDUCTANCE COIL

Original Filed Dec. 8, 1942 4 Sheets-Sheet 4

Inventor

Sidney Y. White

By Moses, Nolte, Crews & Berry

Attorney

Patented May 23, 1950

2,509,049

UNITED STATES PATENT OFFICE 2,509,049

INDUCTANCE COIL

Sidney Y. White, Bayside, N. Y., assignor to Victor S. Johnson, Chicago, Ill.; Victor S. Johnson, Jr., administrator de bonis non of said Victor S. Johnson, deceased Original application December 8, 1942, Serial No. 468,195. Divided and this application November 21, 1946, Serial No. 711,437

3 Claims. (Cl. 175—21)

The present application is a division of my pending application Serial No. 468,195, filed December 8, 1942, for Precision radio apparatus, now Patent No. 2,451,643. The present invention relates to important improvements disclosed in said application. The complete disclosure of said application is made a part of the present specification by reference. Features of that disclosure not claimed herein are claimed in Serial No. 468,195 and in the following divisions thereof:

Ser. No. 506,372, filed October 15, 1943, for Radio apparatus, now Patent No. 2,407,359;

Ser. No. 725,685, filed Jan. 31, 1947 as a continuation of Serial No. 506,373, filed October 15, 1943, for Radio apparatus;

Ser. No. 506,374, filed October 15, 1943, for Electrical condenser, now Patent No. 2,438,592;

Ser. No. 506,375, filed October 15, 1943, for Method of lining up uni-controlled tuned radio apparatus, and now Patent No. 2,922,381;

Ser. No. 506,377, filed October 15, 1943, for Method of temperature compensating tuned circuits, now Patent No. 2,407,360; and Ser. No. 711,438, filed Nov. 21, 1946, for Precision radio tuner, now Patent No. 2,491,347.

It is an important object of the present invention to provide an improved inductance unit which is affected but slightly by variations of temperature and whose response to variations of temperature is dependably maintained.

To this end, it is a salient feature that a novel combination is provided, consisting of a coil form having a low and stable coefficient of expansion, a tensioned conductor wound thereon to form an inductance coil, the conductor having a relatively high coefficient of expansion, and means for maintaining the conductor under a tension which is a substantial part of that necessary to stress the conductor to its elastic limit, whereby, in spite of the difference in expansion coefficients between the conductor and the coil form, close adhesion between the coil form and the conductor is maintained throughout the operative temperature range.

Other objects and advantages will hereinafter appear.

In the drawing forming part of this specification:

Figure 1:
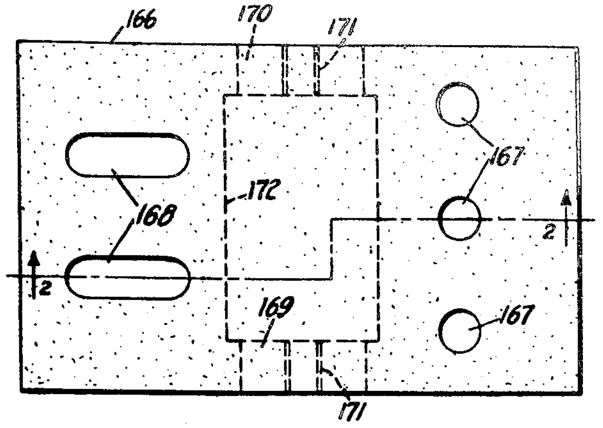
Fig. 1 is a plan view of a coil and condenser supporting plate.

Figs. 1 to 22, inclusive, disclose various desirable illustrative forms of tuned circuit assemblies embodying the invention and parts thereof, each employing a cylindrical coil form and a solenoidal coil wound thereon.

Referring to Figs. 1 to 3 and 8, the means for supporting the coil 35 and its associated condenser is shown as comprising a generally rectangular shaped plate 166 molded of ceramic insulation material and having formed therein three cylindrical holes 167 and a pair of elongated slots 168. Centrally of the block at its front and rear it is provided with arcuate shaped portions 169 and 170 from which depend the short tapered tongues 171, and between the arcuate portions 169 and 170 the middle portion of the plate is undercut in an arcuate shape as indicated at 172. The entire plate is finished to the shape shown by a molding operation and is then baked at a high temperature.

Figures 2, 3, 4, 5, 6:
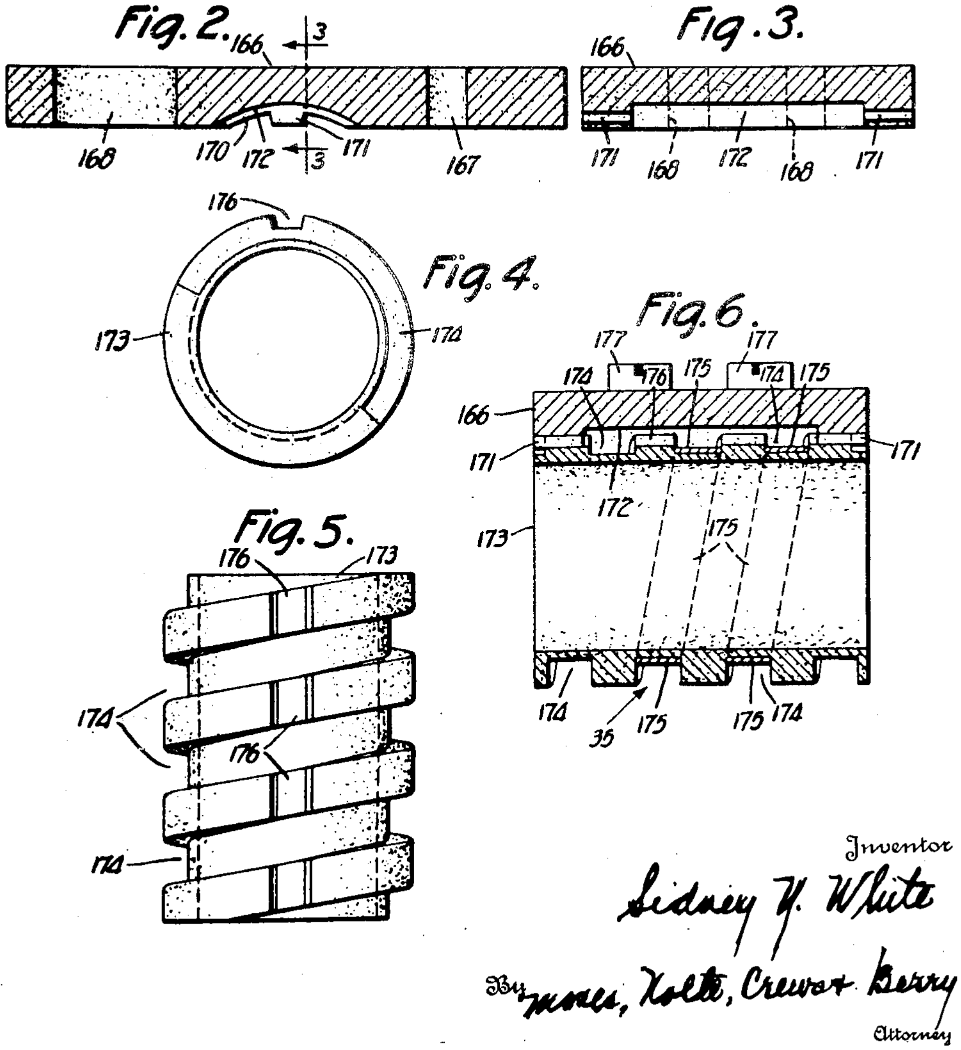
Fig. 2 is a sectional view of the supporting plate shown in Fig. 1, taken on the line 2—2 of Fig. 1, looking in the direction of the arrows.
Fig. 3 is a sectional view of the plate shown in Figs. 1 and 2 taken upon the line 3—3 of Fig. 2 looking in the direction of the arrows.
Fig. 4 is an end view of a coil form employed in both the transmitter and the receiver.
Fig. 5 is a plan view of the coil form shown in Fig. 4.
Fig. 6 is a longitudinal sectional view showing the plate of Figs. 1 to 3 and the coil form of Figs. 4 and 5 in assembled relation with a coil wound on the latter, the section being taken on the line 6—6 of Fig. 8 looking in the direction of the arrows.
Figure 7:
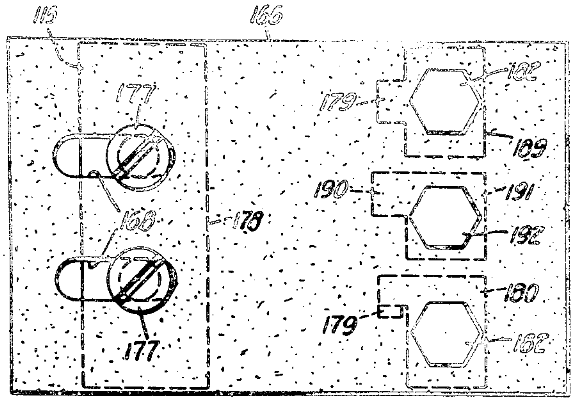
Fig. 7 is a plan view of the coil assembly of Fig. 6.

Referring to Figs. 4 and 5, the coil supporting form 173 is shown as comprising a generally cylindrical shaped tube composed of the same ceramic material of which the plate 166 is formed. The coil form has a spiral shaped groove 174 ground therein adapted to accommodate the coil 35 which is herein shown as comprising a thin metallic ribbon 175 of two turns (see Fig. 6), which may be heated when applied to the coil form, so that it may develop tension through shrinkage as it cools. The coil form is also longitudinally slotted as at 176, the slot being tapered to accommodate the tongues 171 so that the slot 176 and tongues 171 provide means for locating the coil form in a definite position on the supporting plate 166. A material which will glaze is applied to the portions of the coil form and plate 166 which are to be brought into contact with each other and the members then baked to glaze the material which thereupon unites the supporting blocks and coil form into a unitary rigid stable assembly. The ceramic material is preferably of such a nature that its surface contains a large number of small particles which project beyond the general surface level and puncture the skin of the ribbon 175 in numerous places, thereby entirely preventing any slippage of the ribbon on the coil form. The result is that the coil is maintained tightly in engagement with the coil form at all times and does not change in shape due to any changes in temperature or humidity. In other words, the coil and coil form are, as it were, locked together throughout the full length of the coil and the size and shape of the coil remain at all times the same as those of the coil form. This arrangement obviates any non-cyclic variation in distance between one turn of the coil and another and also any non-cyclic variations in the diameter of the coil so that once the coil is wound, its inductance thereafter is not subject to non-cyclic variations due to temperature or aging. The ribbon of the coil is desirably a semi-elastic material such as sterling silver. Such material combines with high conductivity a softness permitting ready penetration by the coil form crystals and an elasticity capable of maintaining the required tension. Pure silver has been found unsuitable because it does not have the required elasticity.

Referring to Figs. 7 to 21, the powdered iron slug 15 is secured against the lower surface of the block 166 by means of a pair of screws 177 which pass through the slots 168. The inner face 178 of the slug 15 is arcuate in shape so that it may be moved inwardly into engagement with the surface of the coil form 173. The manner of adjusting the position of the slug 15 for controlling the slope of the tuning curve of the oscillator will be hereinafter described. The left-hand end of the ribbon 175 is soldered to an inwardly extending tongue 179 formed on a metallic coil terminal 180 which has a flat portion 181 held against the lower face of the block 176 by a threaded hexagon head screw 182. The width of the tongue 179 is substantially equal to that of the groove 174 in the coil form so that it engages the sides of the groove and thereby prevents the coil terminal 180 from rotating when the screw 182 is tightened up. Coil terminal 180 is also provided with a depending lug 183 whose lower edge is provided with an arcuate surface 184, Fig. 8, adapted to engage and be soldered to a metallic cylindrical coating or thin sleeve 185 secured to the outer peripheral surface at one end of a thin tube 186 formed of insulating material (see Figs. 9 and 11). A similar but somewhat smaller metallic coating or sleeve 187 is provided near the other end of tube 86 and the interior of the tube is provided with a thin metallic coating or sleeve 188, so that the entire unit forms an electrical condenser.

Figures 12, 13, 14, 15, 16, 17, 19:
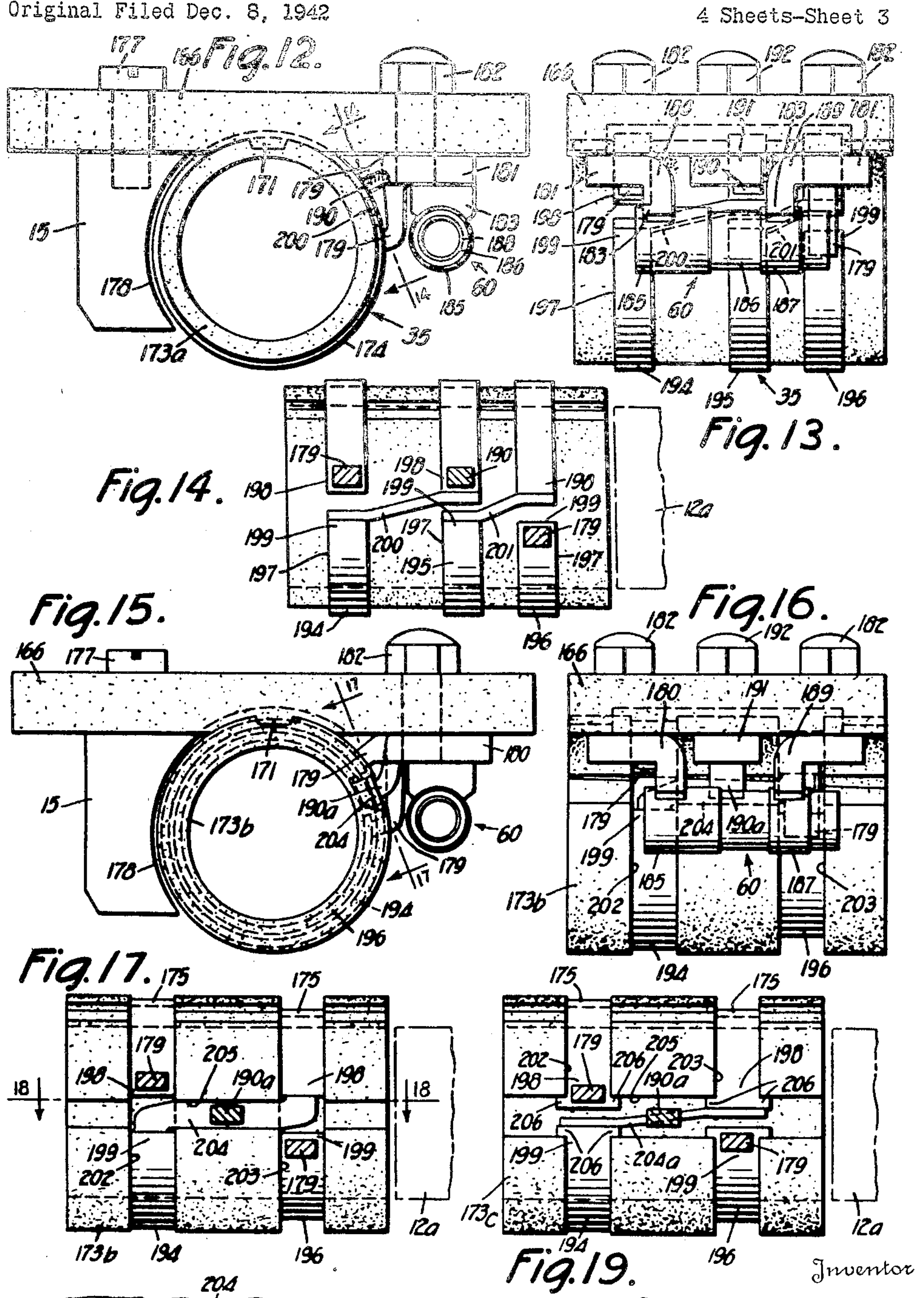
Fig. 12 is a rear end view of a modified form of coil and condenser assembly.
Fig. 13 is a view in side elevation of the assembly of Fig. 12.
Fig. 14 is a sectional view taken upon the line 14—14 of Fig. 12 looking in the direction of the arrows.
Fig. 15 is a rear end view of a further modified form of coil and condenser assembly.
Fig. 16 is a view in side elevation of the assembly of Fig. 15.
Fig. 17 is a sectional view taken upon the line 17—17 of Fig. 15.
Fig. 19 is a sectional view similar to Fig. 17 showing a further modified form of coil.

The coil terminal 189 for the other end of the coil is similar in construction to coil terminal 180, except that its parts are reversed, and corresponding parts of the two terminals are designated by the same reference numerals. The tongue 179 of terminal 189 is secured and soldered to the other end of the ribbon 175 and the arcuate surface 184 of its depending lug 183 is in engagement with and soldered to the coating 187 of the condenser. The mid-tap 53 (Fig. 9) of the coil is soldered to a tongue 190 formed on the center terminal 191 whose main body portion is flat and is threaded to receive the securing screw 192. The tongue 190 extends substantially the full width of the spiral groove in the coil form, thus preventing rotation of coil tap 191 when the screw 192 is tightened. The upper ends of the hexagon securing screws 182 and 192 are rounded off as indicated in Figs. 13 and 14 at 193, thereby providing switch contacts for the coil and condenser assembly. The condenser 60 is of fixed value and is connected across the ends of the oscillator coil. The securing screws 182 and 192 form switch contacts.

Figure 18:
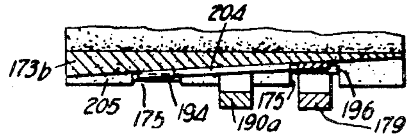
Fig. 18 is a sectional view taken upon the line 18—18 of Fig. 17 looking in the direction of the arrows.

Referring to Figs. 17 to 19, the oscillator coil assembly shown is generally similar to that shown in Figs. 13 to 15, the coil supporting form 173a being formed of ceramic material and being glazed to the supporting block 166 as in Fig. 13. The coil form 173a, however, is not provided with a spiral groove, but its exterior surface is cylindrical. In this case the oscillator winding 35 consists of three turns 194, 195 and 196, which are unequally spaced, the turns 196 and 195 which are first entered by the core 12a being spaced closer together than the turns 195 and 194. Each coil portion consists of a thin metallic ring 197 which may be of silver or other suitable metal, and whose inside diameter is somewhat less than the outside diameter of coil form 173a. The ring 197 on one side is cut transversely, so that its ends 198 and 199 are spaced slightly apart when the coil has been slightly expanded and slipped along the coil form into position, after which its inherent resilience causes the coil to grip the outer surface of the coil form firmly and secure the ring in a definite predetermined position on the coil form in a position normal to the axis thereof. The end 199 of turn 194 is connected to the end 198 of turn 195 by means of a metallic connector 200 which is soldered to the coil ends (see Fig. 14). A similar connector 201 connects the end 199 of turn 195 to the end 198 of turn 196, so that the current in passing through the winding flows in the same direction through all the turns. The coil terminals 180, 189 and 191 are generally similar to those shown in Figs. 8 and 9, the terminals 180 and 189 supporting the condenser 60 and the projecting tongue 179 on the terminal 180 being soldered to the end 198 of turn 194. The tongue 179 formed on coil terminal 189 is soldered to the end 199 of turn 196, while the tongue 190 on terminal 191 is soldered to the end 198 of turn 195, the connection of tongue 190 to turn 195 providing the intermediate tap 53 (Fig. 9) on the oscillator coil 35.

Referring to Figs. 15 to 18 another construction of winding for producing SLF is shown in which the ceramic coil form 173b is provided with two grooves 202 and 203 disposed normal to its axis, and the groove 203 being somewhat deeper than 202, as shown in Figs. 17 and 18. The winding has only two turns 194 and 196, each turn being formed of the metallic ribbon 175. The projecting tongue 179 of coil terminal 180 is soldered to the end 198 of turn 194 and the tongue 179 of terminal 189 is soldered to the end 199 of coil turn 196. The two turns are connected together by means of a thin metallic connector 204 which is disposed in a longitudinally extending groove 205 formed in coil form 173b, the groove 205 sloping inwardly in the direction of turn 196 as illustrated in Fig. 18. One end of connector 204 is soldered to the end 199 of turn 194 and the opposite end of connector 204 is soldered to the end 198 of turn 196 as shown in Fig. 17, so that the current passes through both turns of the coil in the same direction. The metallic ribbon is held under tension by the connector 204, which connector is prevented from rotating by the groove 205 in the coil form so that the inner surface of the ribbon is maintained at all times in firm engagement with the coil form. The center tap on the coil is provided by means of the tongue 190a on the center coil terminal 191, this tongue being soldered to the middle of the connector 204 as indicated in Figs. 15 to 17. It is thus seen that the illustrated arrangement provides an oscillator coil in which the turns are of different diameter and have no pitch, and also provides a ready means for tapping the coil at its midpoint.

The coil arrangement shown in Fig. 19 is generally similar to that shown in Fig. 17 and the corresponding parts are indicated by similar reference numerals. In this case the connector member 204a does not bear against the sides of the groove 205 in the coil form 173c. The ends of each coil turn are provided with a pair of projecting ears 206 which abut against the wall of the groove 205 as shown. In securing the turns of ribbon to the coil form the ears 206 at one end of the ribbon are placed against the wall of groove 205 and the turn of ribbon wrapped around the coil form in the groove therein, whereupon the ribbon may be heated by an electric current from a suitable source to cause it to expand considerably in length whereupon the pair of ears 206 at the other end of the coil will be slipped into the groove 205 and the ribbon permitted to cool. The contraction of the ribbon will place it under tension and cause its interior surface to be pressed into firm engagement with the bottom wall of the groove in which it is seated.

Figure 8:
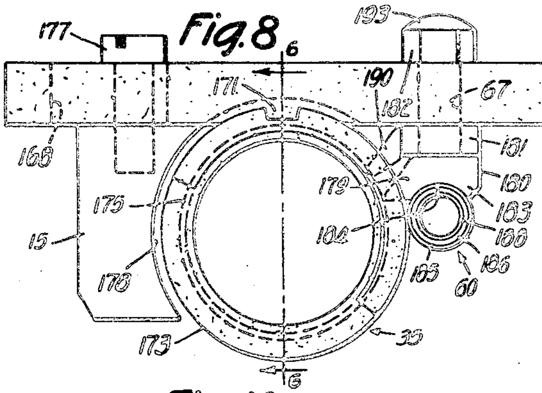
Fig. 8 is a rear end view showing the coil assembly of Figs. 6 and 7 together with an associated tank condenser.
Figure 9:
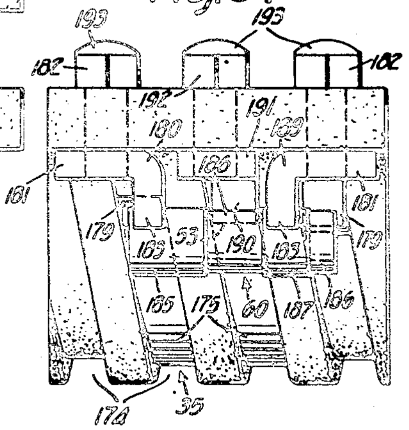
Fig. 9 is a view in side elevation of the coil and condenser assembly of Fig. 8.
Figure 10:
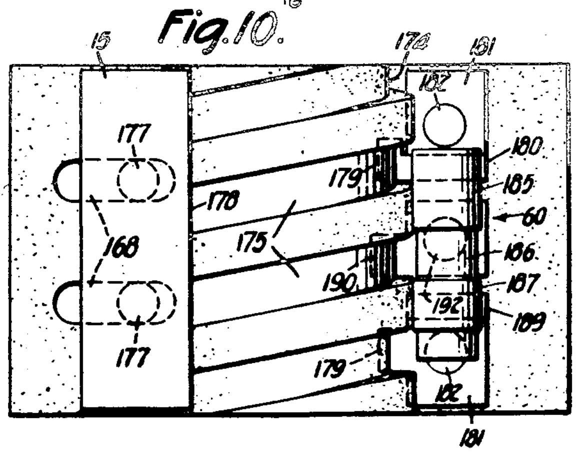
Fig. 10 is a bottom view of the coil and condenser assembly shown in Fig. 8.
Figure 20:
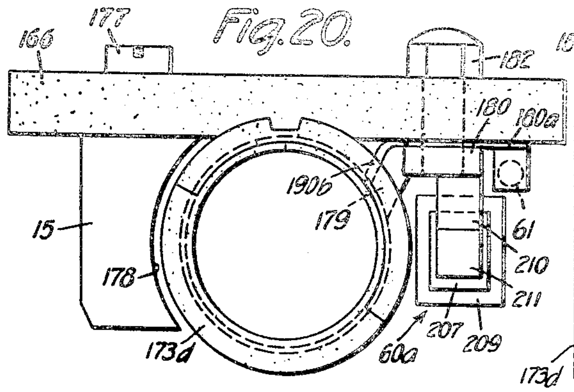
Fig. 20 is a rear end view of a modified form of coil and condenser assembly.
Figure 21:
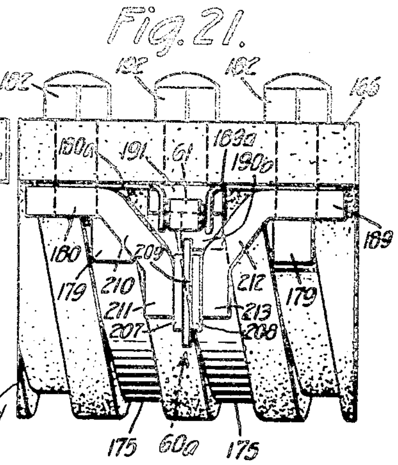
Fig. 21 is a view in side elevation of the assembly of Fig. 20.

A modified form of oscillator coil and condenser assembly is shown in Figs. 20 and 21, the coil being a two-turn spiral coil wound on coil form 173d, the general construction being similar to that shown in Figs. 8 to 10, but in this case the condenser 60a is of the mica type. The tongues 179 of coil terminals 180 and 189 are soldered to the ends of the winding, and the tongue 190b of middle terminal 191 is soldered to the midpoint of the winding as in Fig. 9. The mica condenser 60a comprises two metallic plates 207, 208 which are disposed against the opposite faces of a thin sheet of mica 209 which is of substantially larger area than the plates 207, 208. Coil terminal 180 is provided with an integrally formed extension 210 whose lower end 211 is vertical and bears against condenser plate 207. Coil terminal 189 is provided with an integrally formed extension 212 whose lower portion 213 is vertical and bears firmly against the plate 208 of the condenser. The condenser 60a is thus entirely supported by the extensions 210 and 212 of coil terminals 180 and 189, these extensions being short and massive, so that their inductance is kept at a minimum value.

Spring fingers 180a and 189a are clamped between the plate 166 and the respective blocks 180 and 189 by screws 182. The fingers 180a and 189a extend toward one another and have upturned ends disposed in confronting relation. The upturned ends jointly form a conductive, spring holder for a second condenser 61.

Figure 22:
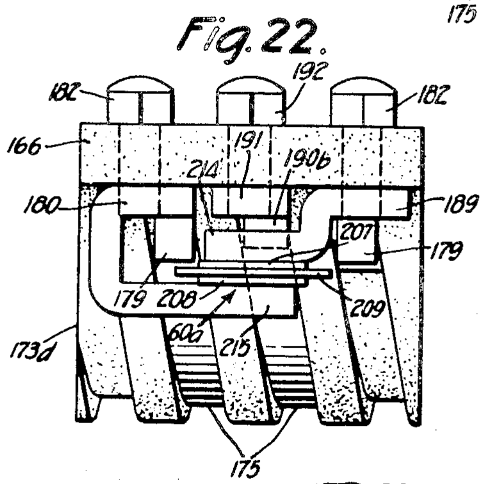
Fig. 22 is a view in side elevation of a further modified form of coil and condenser assembly.

The coil and condenser assembly shown in Fig. 22 is similar to that shown in Fig. 21 and corresponding parts are designated by the same reference numerals. In this case, however, the mica condenser is disposed horizontally, coil terminal 189 being provided with a flat horizontally extending portion 214 which bears against the upper condenser plate 207, and coil terminal 180 being provided with a flat horizontal portion 215 which bears against the lower condenser plate 208 as shown. In both forms of construction no wires are required for connecting the condenser in the circuit, the connections thereto being provided by portions of the coil terminals themselves, these portions being massive and their inductance, therefore, being negligible in comparison with the inductance of the coil itself.

In all of the tuned circuit assemblies described, other than that of Figs. 12 to 14, a ribbon having a thickness of about three mils and a width of fifty to seventy mils may be advantageously employed. These dimensions are cited by way of example, however, and not as defining practical limits.

At 125 mc., if we use concentrated circuit elements of the L-C type, the coil used can be little more than 2 inches of wire. We can, therefore, use no leads whatsoever, in a disciplined circuit, as we want all the wire possible on the coil obeying a single set of rules of expansion and vibration.

Since high sustained accuracy is sought for, no structure or material can be used except of the most unchanging nature. Physically, glass, quartz and ceramic are most suitable and have good retrace characteristics of dielectric constant and physical size when varied with temperature. No structure can be employed where there is the slightest possibility of any permanent change to any degree, either electrical or mechanical.

The type of tuning employed is of the core type, and while ferrous cores will be most generally employed, the conductive type core, as for instance silver or copper, may well be used in some applications.

The tuned circuit must, therefore, be designed with the requirements of core tuning in mind. It is basic, however, that before we can tune the circuit over a range, the circuit without such tuning means must in itself maintain a fixed frequency to a high order of accuracy. It must also allow trimming, tracking and aligning with a precalibrated dial having great length and accuracy of resetting. It must have no wiring at all.

The coil must allow use of one to four turns, for example, and must allow bringing out a tap to any turn or fraction of a turn. Its external tuned circuit must include a tuning condenser having a minimum inductance, and the whole outside return loop must be minimized.

The concentration of over 90% of the inductance is actually in the coils of the tuned circuit assemblies described where it is capable of being acted on by a core.

The diameter of the coil is chosen to be about 405 mils in the illustrative instance for use with a 375 mil core. Considerable difficulty is had in the ceramic art in making thin walled tubes beyond a certain minimum thickness of wall. Maximum tuning ranges obtainable with core tuning are reached where the core substantialy fills up the coil, but it must still freely pass through the bore of the coil form. If we chose this same ratio with a 125 mil core, the wall thickness would be less than 5 mils, an impracticable figure for quantity production in the present state of the ceramic art.

The coil form is made with grooves for the conductor, to have the thick lands to support the thin grooves during firing, and also to guide in the winding.

Since the conductor chosen must have high conductivity, its thermal coefficient of expansion must also be high, at least two or three times that of the coil form. A spiral winding inherently has no strength of its own, so it must be the mechanical slave of the coil form. This means the wire must be wound under sufficient tension and have enough elasticity to cling to the form at the most adverse temperature.

The cross-section of the conductor is a very thin strap, rather wide. If large, round conductors are used, such as #14 round wire, the current tends to hug the coil form as it is the smallest diameter of the turn. Any good conductor has a large temperature coefficient of resistance, however, and if the temperature be raised the resulting increased resistance causes a redistribution of the current, causing the diameter of the mean current path to be increased. This markedly increases the inductance, since diameter of the current path is square in the formula for the inductance coil, and great changes in frequency result.

By using a very thin strap of the order of three mils in thickness, this effect is minimized and a disciplined current path results. Instead of using pure silver, sterling silver is used for greater toughness and elasticity and may be wound on the form quite hot by passing a heavy current through it while winding, in which case it shrinks on the form. Tension may be used also, sufficient to stress it nearly half way to its elastic limit so it hugs the coil form like a rubber band.

Silver plated alloys having negligible coefficients of expansion, used in large cross-section, maintain their cross-sections under temperature variation, but the current redistribution is the same as for pure silver, and straps of such construction must be wound under tension and in general have no advantage over the thin sterling silver strap, which may be flattened wire.

It is of great advantage to use ceramics of the low loss type because of the presence on the surface of minute sharp crystal structures which apparently pierce the skin of any unhardened metal pressed firmly against them. Repeated temperature cycling of these coils from −40 to +217° F. show no creepage of the winding, since each unit length is captured by its adjacent crystals and held firmly in place.

The length of coil chosen must also depend in part upon the tuning curve desired and upon the length of core travel most easily obtained with a desirable dial mechanism. A coil 375 mils long, measured center of winding strap to center of winding strap gives an active core movement of about 250 mils for 25% tuning range.

In any coil to be used with a core the inside of the coil form must be left free to pass the core. Most methods of terminating coils use rivets, eyelets, or passing the conductor through holes in the form, all of which would interfere with core movement. Some structure outside the simple cylindrical coil form is, therefore, required. This takes the form of the plates or block 166 with its associated terminal blocks 180, 189 and 191 (see Figs. 13, 14 and 15).

The block 166 is preferably glazed to the coil form. Plastic cements are undesirable because of cold flow and change with age, but a good glaze in the joint fired at 1700° F. really makes the two pieces unitary.

Plate 166 allows use of massive structures such as blocks 180 and 189 to be employed to give a rigid and definite termination of the inductance at either end. These blocks are given large cross-section so that they will have a minimum possible inductance, and the tongues 179 provide exact termination of the inductance wound on the form, in that the take-off of the current is normal to the axis of the coil. Each tongue 179, being the full width of groove 174, provides a rigid non-turning structure when the contact screws 182 are tightened up. Shaping of these blocks to include the turned up portion 183 (Fig. 9) or the flat portions 211 and 213 (Fig. 21) or 214 and 215 (Fig. 22) allow either a cylindrical or flat type of condenser to be used for tuning the circuit.

Figure 11:
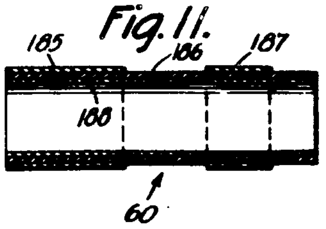
Fig. 11 is a longitudinal, sectional view showing details of the condenser of Figs. 8 to 10, inclusive.

A number of assemblies have been assembled and tested using the condenser 60 of Fig. 11, which is a commercial form where the capacity may be formed between the inner plate 188 and the two bands 187 and 185 forming two condensers in series, or the outer band 185 may be continued around the end of the hollow cylinder joining the inside plate 188 forming a single condenser through the ceramic body 186.

When this condenser is laid in the cradle formed by the connecting blocks 183 it will be seen that an absolute minimum inductance return path closing the physical separation between the ends of the coil proper has been achieved.

It is found to be a considerable advantage in this self-contained structure that rounded contacts 193 can be used as a switch in the case of multi-band apparatus. There is a real problem in switching ultra-high frequency circuits where the switch is placed within the tuned circuit. A coil in the broadcast band may easily have an RF resistance of 5 ohms, or 5000 milliohms. A satisfactory commercial type of small switch may have contact resistances of 5 to 40 milliohms, which is negligible in proportion to 5000 milliohms. A two-turn coil such as shown in Fig. 13, however, may have a total RF resistance in the entire tuned circuit of only 40 milliohms, and consequently the contact resistance of any practical form of switch, which of necessity must be small because of the small physical dimensions of these circuits, becomes a substantial portion of the total resistance. It is an advantageous feature of the present invention that each coil carries its own tank condenser with it, allowing switching of the charging current to the electrodes of the tubes only, a much easier matter.

Provision of these contacts also allows desirable slipping of the whole tuned circuit assembly axially.

Provision of the plate 166 allows for the use of a solid block trimmer 15 as shown in Fig. 8. Plate 166 also provides a fastening means for the assembly.

The necessary provision for a tap on the coil is met by the provision of the third contact 192 (Fig. 9), the block 191, and the tongue 190 engaging the coil.

This whole assembly allows the use of variable diameter turns in the coil as shown in Fig. 16, and also variations in any desired manner of the distance between the coil turns as shown in Fig. 14.

The tuned circuit assembly shown in any of the forms of Figs. 7 to 10, and 12 to 22, inclusive, makes provision for a single unit that has in effect fastening means, tuning means, switch, tank condenser, trimming, tracking and aligning means in a single simple structure, so that all the frequency determining elements are well within a cubic inch, and under temperature, vibration and shock, all travel together. There is thus provided a single universal unit that can be used for transmitter, receiver, wave trap, or any of the numerous uses to which tuned circuits can be put.

The Q of these assemblies is found to be quite high without the core. If measured in air without any associated apparatus, the Q is about 700. When measured in the coil holder and with an oscillator tube assembly attached, with the tube in place but not lit, the Q exceeds 400.

A further advantage of this type of construction is that no parasitic loops of any kind are formed to give resonant absorptive effects or resonant voltage rises at any frequency within the operating range of the current acorn tubes, and in no case below 1500 mc.

Frequency drift due to changes in temperature have been rather fully investigated.

The true inductance of the coil varies at a rate proportional to the thermal coefficient of expansion of the coil form which is six parts per million per degree. Current redistribution due to the increased resistance of the winding conductor with heat is practically eliminated by the use of an extremely thin strap for the conductor.

Both the real and apparent inductance of the tuned circuit assembly lower the frequency as the temperature increases, so a slightly negative temperature coefficient condenser 60 is used for tuning the circuit to provide a balance, resulting in very small change in frequency with temperature. These condensers employ generally available ceramic materials which may be chosen to yield a temperature coefficient which is highly negative, such as an almost pure titanium dioxide mix, which gives —750 parts per million per degree, up to those going slightly positive in their temperature coefficient of capacity.

A coil stretched out over too much length is in general undesirable as the ends are too far apart physically, forcing the use of a long return path on the outside of the coil which gives us unwanted inductance in the tuned circuit, since only that portion of the wire in the circuit which is wound on the coil form will be affected by the core used, and any external inductance will lessen the tuning range and consequently the SLF range we may possibly reach.

It is the nature of a coil of only two or three turns spread over a length equal to its own diameter that the turns have considerable pitch, and as a consequence the flux is by no means along the axis, but is affected by the pitch of the end turn. Also, in the form of construction shown in Fig. 13 there is a mass of conductive material on one side as shown by the interconnecting blocks 180, 189 and the tuning condenser 186 which again tends to throw the flux off the true axis, and maximum flux has been observed as much as 20° off the axis when the flux distribution at the end of the coil was investigated.

An entirely different line of attack is shown by the construction illustrated in Figs. 12 and 13, where a "no pitch" winding is used. Here each turn, except for a rather negligible cross-over connector, is exactly normal to the axis of the coil, and investigation showed the flux to be almost purely axial. By critical spacing of the three turns shown in Fig. 13, the rate of increase of the flux can be controlled, especially of the mutual inductance between the turns.

It has been possible to utilize this variation caused by the mutual inductance between the turns to assist in the production of SLF.

It is believed to be possible to increase the tuning range by reducing the diameter of the coil form somewhat, but because of inability to procure special ceramic coil forms required it has not been possible for the present to investigate the problem further in this direction.

Where it is desired to establish tuning ranges in the portion of the spectrum above 160 megacycles or so, and still maintain a high order of circuit stability by having a good sized tuning condenser, a two-turn coil must be used. It has been found insufficient merely to vary the distance between these two turns to obtain SLF or any other desired curve, so a new variable is introduced, the choosing of different diameters of the two turns, with the turn on the entering side of the core the smaller. The coil in which turns are of different diameters is shown in Figs. 15 to 19, inclusive.

Figure 23:
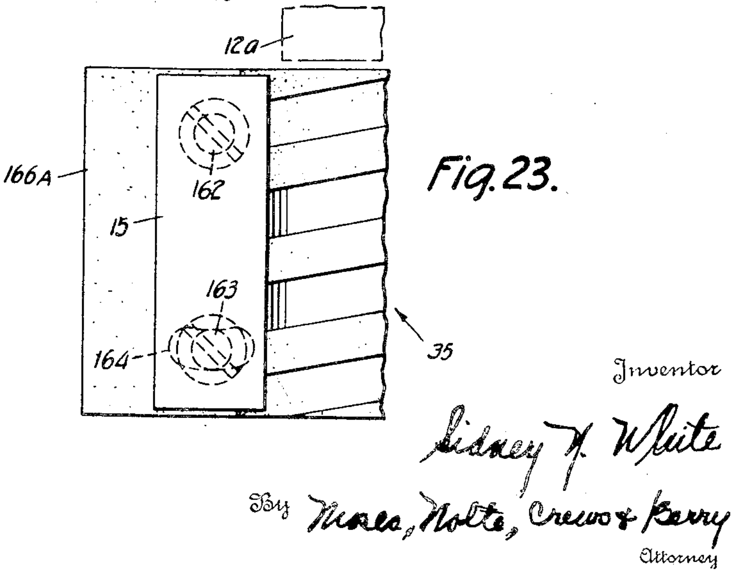
Fig. 23 is a fragmentary bottom plan view illustrating a coil assembly which includes a modified mounting of an adjustable permeable element that forms a part of the assembly.

The arrangement of slug 15 shown in Figs. 8 and 10 show the slug maintained parallel to the axis of the coil. An alternative arrangement is illustrated in Fig. 23, where the slug 15 is shown pivoted at one end with the screw 162 in a close fitting round hole in the base 166A. The other end is held with the screw 163 arranged to allow movement in the arcuate slot 164.

This arrangement obviates the necessity of maintaining the slug parallel to the axis of the coil during the adjustment of the slug and is found somewhat more effective in some cases in displacing the tuning curve a large amount at the lower frequency end of the tuning range while minimizing any unwanted effects at the high frequency end thereof.

Where it is desired to precisely adjust the resonant frequency of an oscillator or other resonant circuit to a single predetermined frequency, the capacity and inductive elements of the circuit may be made to tune to this frequency as close as practical considerations permit, leaving the precise adjustment to the correct frequency to the manipulation of the slug 15. It will, therefore, be seen that a single self-contained unit in the absence of the movable core 12*a* permits radio apparatus to be built to resonate at a single assigned frequency in a very simple, compact and stable form.

I have described what I believe to be the best embodiments of my invention. I do not wish, however, to be confined to the embodiments shown, but what I desire to cover by Letters Patent is set forth in the appended claims.

I claim:

1. In combination, a rigid cylindrical, ceramic coil form having a very low, stable coefficient of expansion, an inductance in the form of a flat, highly conductive, semi-elastic ribbon supported thereon, the ribbon having a relatively high coefficient of expansion, and means for anchoring the ribbon to the coil form and for maintaining the ribbon under a tension which is a substantial part of that necessary to stress the ribbon to its elastic limit, the coil form having a surface structure of fine, sharp, crystalline form which penetrates the ribbon surface and interlocks with it to exert a snubbing action, the construction and arrangement being such that, notwithstanding the difference in expansion coefficients between the ribbon and the coil form, close adhesion of the ribbon to the coil form is maintained by maintaining the tension of the conductor throughout the operative temperature range.

2. In combination, a rigid cylindrical coil form, an inductance in the form of a flat, highly conductive, semi-elastic ribbon mounted thereon, the ribbon having a relatively high coefficient of expansion, and means for anchoring the ribbon to the coil form and for maintaining the ribbon under a tension which is a substantial part of that necessary to stress the ribbon to its elastic limit, the coil form being composed of insulating ceramic material which has a low coefficient of expansion relative to the ribbon and is unaffected in its physical and electrical properties by changes of temperature within the operative temperature range, and which has a surface structure of fine, sharp, crystalline form which penetrates the ribbon surface and interlocks with it to exert a snubbing action, the construction and arrangement being such that, notwithstanding the difference in expansion coefficients between the ribbon and the coil form, close adhesion of the ribbon to the coil form is maintained by maintaining the tension of the conductor throughout the operative temperature range.

3. In combination, a rigid cylindrical coil form, a tensioned conductor of uniform cross-section disposed around the outside of the coil form to form an inductance coil, and means for anchoring the conductor to the coil form and for maintaining the conductor in tensioned engagement with the coil form, the coil form being composed of insulating material whose changes in physical and electrical characteristics with temperature are small, and of great cyclical and secular stability, and which has a structure of fine, sharp, crystalline form which penetrates the conductor surface and interlocks with it to exert a snubbing action, the construction and arrangement being such that, notwithstanding the difference in expansion coefficients between the conductor and the coil form, close adhesion of the conductor to the coil form is maintained by maintaining the tension of the conductor throughout the normal temperature range.

SIDNEY Y. WHITE.

REFERENCES CITED

The following references are of record in the file of this patent:

UNITED STATES PATENTS

| Number | Name | Date |
|---|---|---|
| 1,891,481 | Scofield | Dec. 20, 1932 |
| 1,897,253 | Gaubert et al. | Feb. 14, 1933 |
| 1,904,199 | Brewer | Apr. 18, 1933 |
| 1,910,957 | Llewellyn | May 23, 1933 |
| 1,971,452 | Herrmann | Aug. 28, 1934 |
| 1,996,823 | Osnos | Apr. 9, 1935 |
| 2,018,626 | Polydoroff | Oct. 22, 1935 |
| 2,115,826 | Norton et al. | May 3, 1938 |
| 2,268,742 | Daugherty | Jan. 6, 1942 |
| 2,416,393 | Huckleberry | Feb. 25, 1947 |

FOREIGN PATENTS

| Number | Country | Date |
|---|---|---|
| 624,391 | Germany | Jan. 18, 1936 |

OTHER REFERENCES

Article, The Temperature Coefficient of Inductances for Use in a Valve Generator, by E. B. Moulin, from Proceedings of the Institute of Radio Engineers, vol. 26, No. 11, Nov. 1938.